(12) United States Patent
Rhee

(10) Patent No.: US 8,201,938 B2
(45) Date of Patent: Jun. 19, 2012

(54) EYEGLASSES WITH SLOT FOR DETACHABLE ACCESSORIES

(76) Inventor: Donald Seung-Yeup Rhee, Buena Park, CA (US)

( * ) Notice: Subject to any disclaimer, the term of this patent is extended or adjusted under 35 U.S.C. 154(b) by 118 days.

(21) Appl. No.: 12/780,804

(22) Filed: May 14, 2010

(65) Prior Publication Data

US 2011/0279769 A1 Nov. 17, 2011

(51) Int. Cl.
G02C 11/02 (2006.01)

(52) U.S. Cl. .......................... 351/52; 351/111; 351/158

(58) Field of Classification Search .................... 351/51, 351/52, 111, 119, 121, 158
See application file for complete search history.

(56) References Cited

U.S. PATENT DOCUMENTS 5,110,198 A * 5/1992 Travis et al. .................. 351/124
7,367,670 B2 * 5/2008 Duane .......................... 351/158

* cited by examiner

*Primary Examiner* — Huy K Mai
(74) *Attorney, Agent, or Firm* — Patent Law Group LLP; David C. Hsia

(57) ABSTRACT

An eyeglasses frame includes a frame front comprising end pieces, and temples coupled to the end pieces. At least one temple defines a slot for receiving a decorative or functional accessory. The accessory has a hook fastener that is inserted into the slot to removably attach the accessory to the temple.

12 Claims, 5 Drawing Sheets

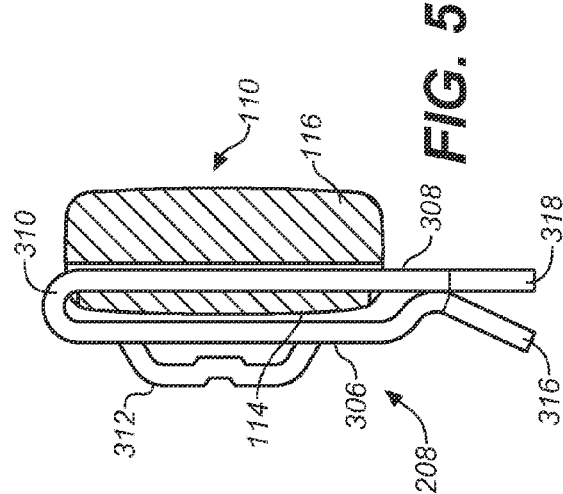
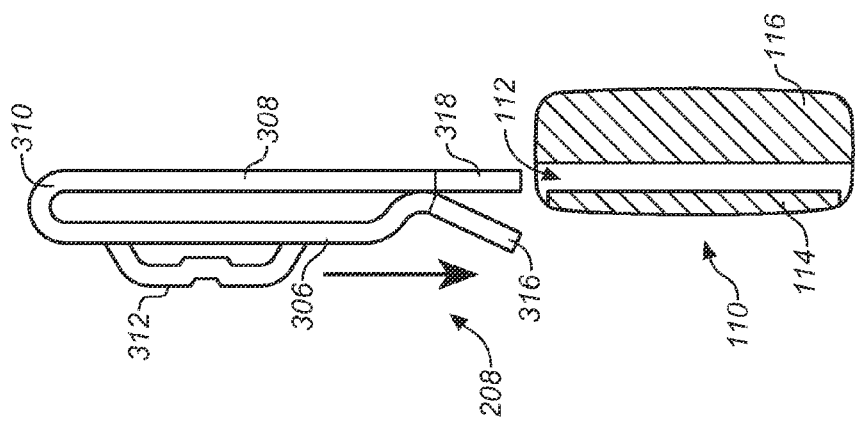
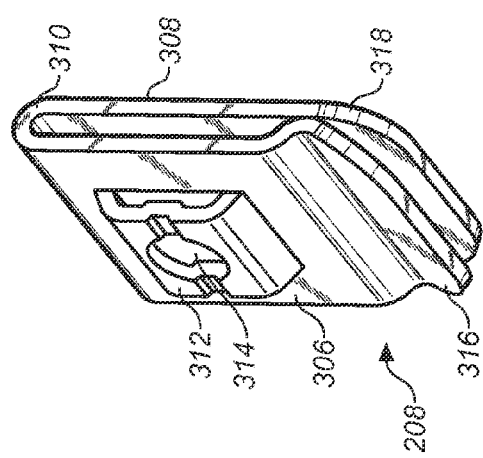

EYEGLASSES WITH SLOT FOR DETACHABLE ACCESSORIES

FIELD OF INVENTION

This invention relates to sunglasses with detachable charms or other decorative accessories.

DESCRIPTION OF RELATED ART

Eyeglasses are frames bearing lenses worn in front of the eyes, normally for vision correction or eye protection. Glasses are typically supported by pads on the bridge of the nose and by temples placed over the ears. Sunglasses are glasses with lenses that are colored, polarized, or darkened.

SUMMARY

In one or more embodiments of the present disclosure, an eyeglasses frame includes a frame front comprising end pieces, and temples coupled to the end pieces. At least one temple defines a slot for receiving a decorative or functional accessory. The accessory has a hook fastener that is inserted into the slot to removably attach the accessory to the temple.

BRIEF DESCRIPTION OF THE DRAWINGS

In the drawings:

FIG. 3 is a perspective view of a hook fastener for the charm of FIG. 2 in one or more embodiments of the present disclosure;

FIGS. 4 and 5 are partial cross-sectional views illustrating the insertion of the hook fastener of FIG. 3 into the slot of a temple of FIG. 1 in one or more embodiments of the present disclosure;

Use of the same reference numbers in different figures indicates similar or identical elements.

DETAILED DESCRIPTION OF THE INVENTION

Figure 1:
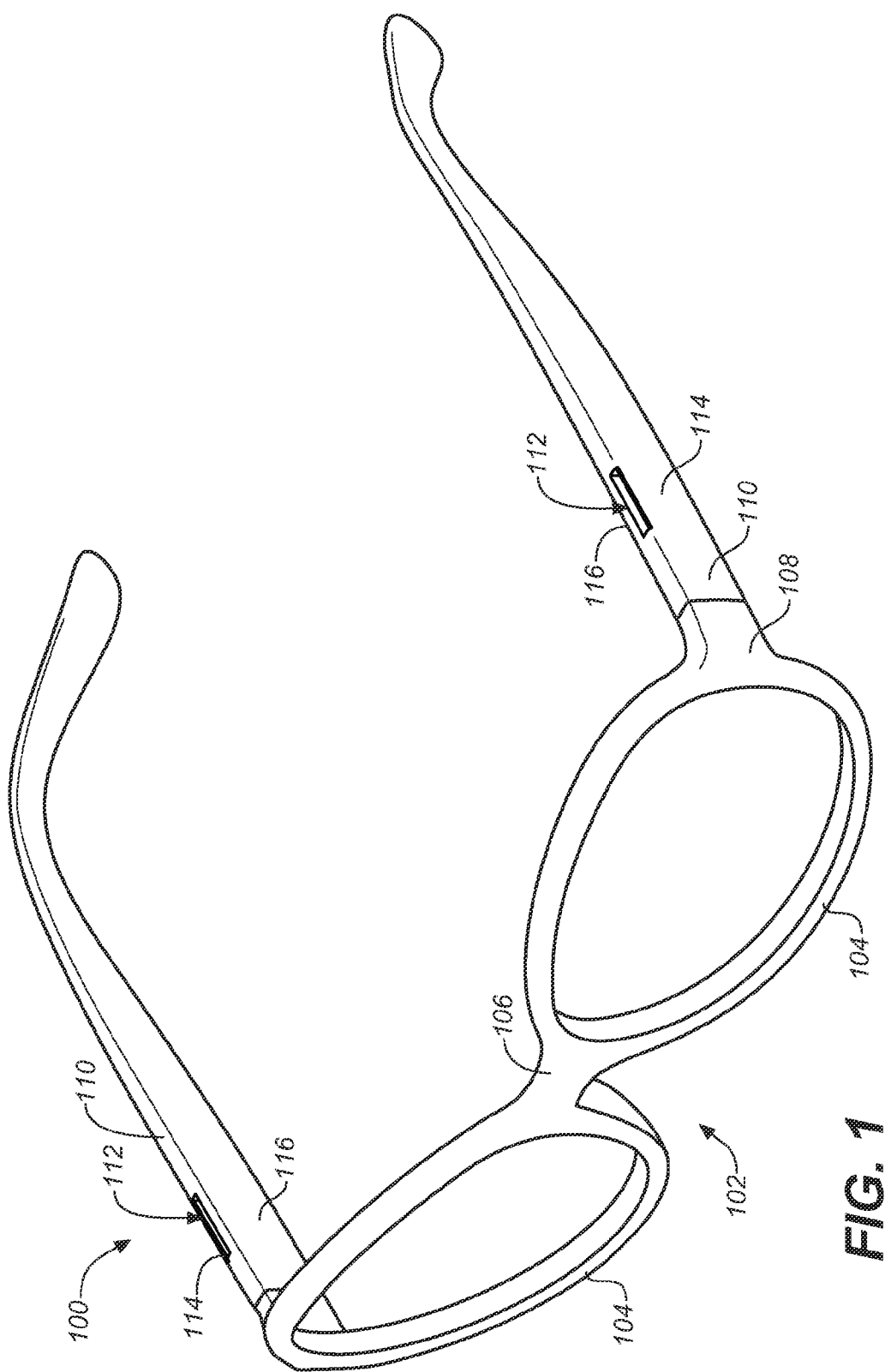
FIG. 1 is a perspective view of an eyeglasses frame in one or more embodiments of the present disclosure.

FIG. 1 is a perspective view of an eyeglasses 100 in one or more embodiments of the present disclosure. Eyeglasses 100 includes a frame 102 having rims 104, a bridge 106 between the rims, and end pieces 108 (only one is visible and labeled) at the opposite far ends of the rims. Frame 102 further includes temples 110 coupled fixedly or rotatably to end pieces 108.

Each temple 110 defines a slot 112 extending through the temple. Slot 112 may be a rectangular slot. Slot 112 is flanked on one side by a temple exterior sidewall 114 and on the other side by a temple interior sidewall 116. The width of temple exterior sidewall 114 may be thinner or thicker than the width of temple interior sidewall 116 so slot 112 is horizontally offset toward the exterior or the interior of temple 110.

Figure 2:
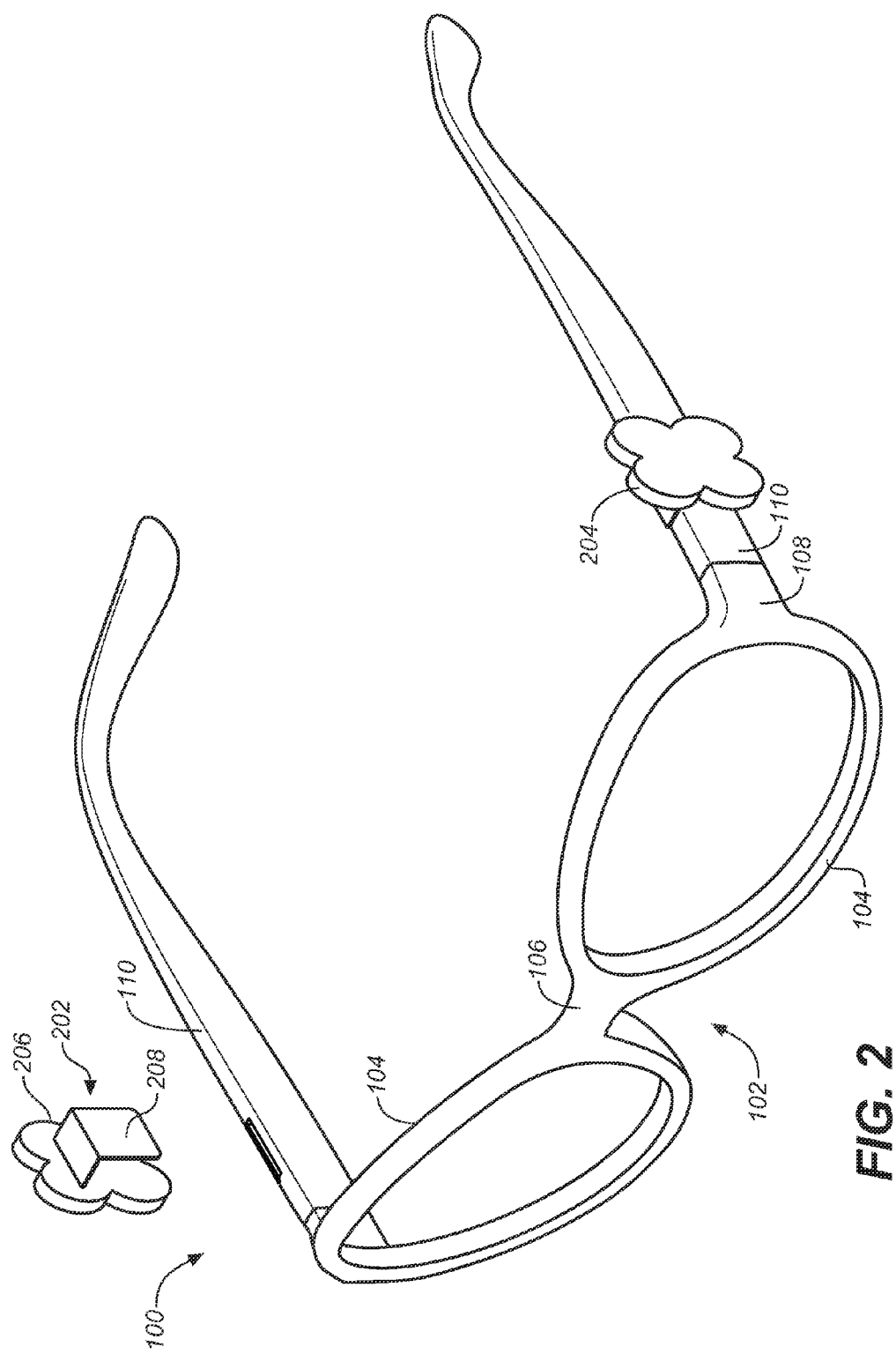
FIG. 2 is a perspective view of the eyeglasses frame of FIG. 1 with detachable charms in one or more embodiments of the present disclosure.

FIG. 2 is a perspective view of eyeglasses 100 with detachable accessories 202 and 204 in one or more embodiments of the present disclosure. Accessory 202 may be a charm including a decorative object 206 for eyeglasses 100, and a hook fastener 208 fixed to the decorative item. Decorative object 206 may be a piece of jewelry, a plush toy, an accessory, a logo, or other decorative objects. Hook fastener 208 is inserted into slot 112 to detachably but rigidly secure ornament 202 to eyeglasses 100. Alternatively accessory 202 may be a flashlight, a Bluetooth device, a heads up display device, a laser pointer, a golf marker, a battery, an ear piece for cellular phone, or a neck strap attached by hook fastener 208 to eyeglasses 100. Accessory 204 may have similar construction as accessory 202.

FIG. 3 is a perspective view of hook fastener 208, shown without decorative object 206 (FIG. 2), in one or more embodiments of the present disclosure. Hook fastener 208 is generally shaped like a "U" and includes a hook exterior plate 306 facing away from eyeglasses 100, a hook interior plate 308 facing into the eyeglasses, and a mid section 310 joining the hook exterior and interior plates. Hook exterior plate 306 and hook interior plate 308 are typically of same length.

Hook exterior plate 306 includes an optional mount 312 that protrudes outward. Mount 312 defines an opening 314 for receiving an eyelet or post to secure hook fastener 208 to decorative object 206 (FIG. 2). Instead of mount 312, hook fastener 208 can be fixed to decorative object 206 by other methods including bonding and welding.

In one or more embodiments, hook exterior plate 306 has a "V" or "U" shaped kinked end 316 that curves toward hook interior plate 308 and then away from the hook interior plate. Kinked end 316 is spring-loaded to rest against hook interior plate 308 Kinked end 316 typically has a blunt and rounded edge. In one or more other embodiments, the arrangement is reversed so hook interior plate 308 has kinked end 316 that is spring-loaded against hook exterior plate 306.

Hook interior plate 308 has an end 318 for inserting into slot 112 (FIG. 1). Hook exterior plate 308 defines an opening (not fully visible) so a tool (die) can plastically deform a hollow shank of an eyelet or post to secure hook exterior plate 306 to decorative object 206 (FIG. 2).

FIGS. 4 and 5 are partial cross-sectional views illustrating the insertion of hook fastener 208 into slot 112 of temple 110 in one or more embodiments of the present disclosure. Referring to FIG. 4, when hook fastener 208 is inserted into slot 112, kinked end 316 of hook exterior plate 306 and end 318 of hook interior plate 308 abut a leading edge of temple exterior sidewall 114. As hook fastener 208 is further inserted into slot 112, the slope of kinked end 316 allows the leading edge of temple exterior sidewall 114 to push against hook exterior plate 306 and hook interior plate 308 so that hook fastener 208 can slide into slot 112.

Referring to FIG. 5, as kinked end 316 is spring-loaded, it snaps back down against hook interior plate 308 when the kinked end slides past temple exterior sidewall 114 after hook fastener 208 is fully inserted into slot 112. This snapback produces an audible sound (e.g., a "pop" or a "click") that indicates to the user that hook fastener 208 is secured. The width of hook interior plate 308 substantially matches the width of slot 112 to reduce relative movements between charm 202 and eyeglasses 100. Similarly, the length and the width of the space between mid section 310 and the point where kinked end 316 rests against hook interior plate 308 substantially matches the height and the thickness of temple exterior sidewall 114 to reduce relative movements between charm 202 and eyeglasses 100.

Once fully inserted, the shape of kinked end 316 prevents hook fastener 208 becoming unintentionally detached from temple 110. Specifically, an intentional manual force is needed to push kinked end 316 and end 318 against temple exterior sidewall 114 to release hook fastener 208 from temple 110.

Figure 6:
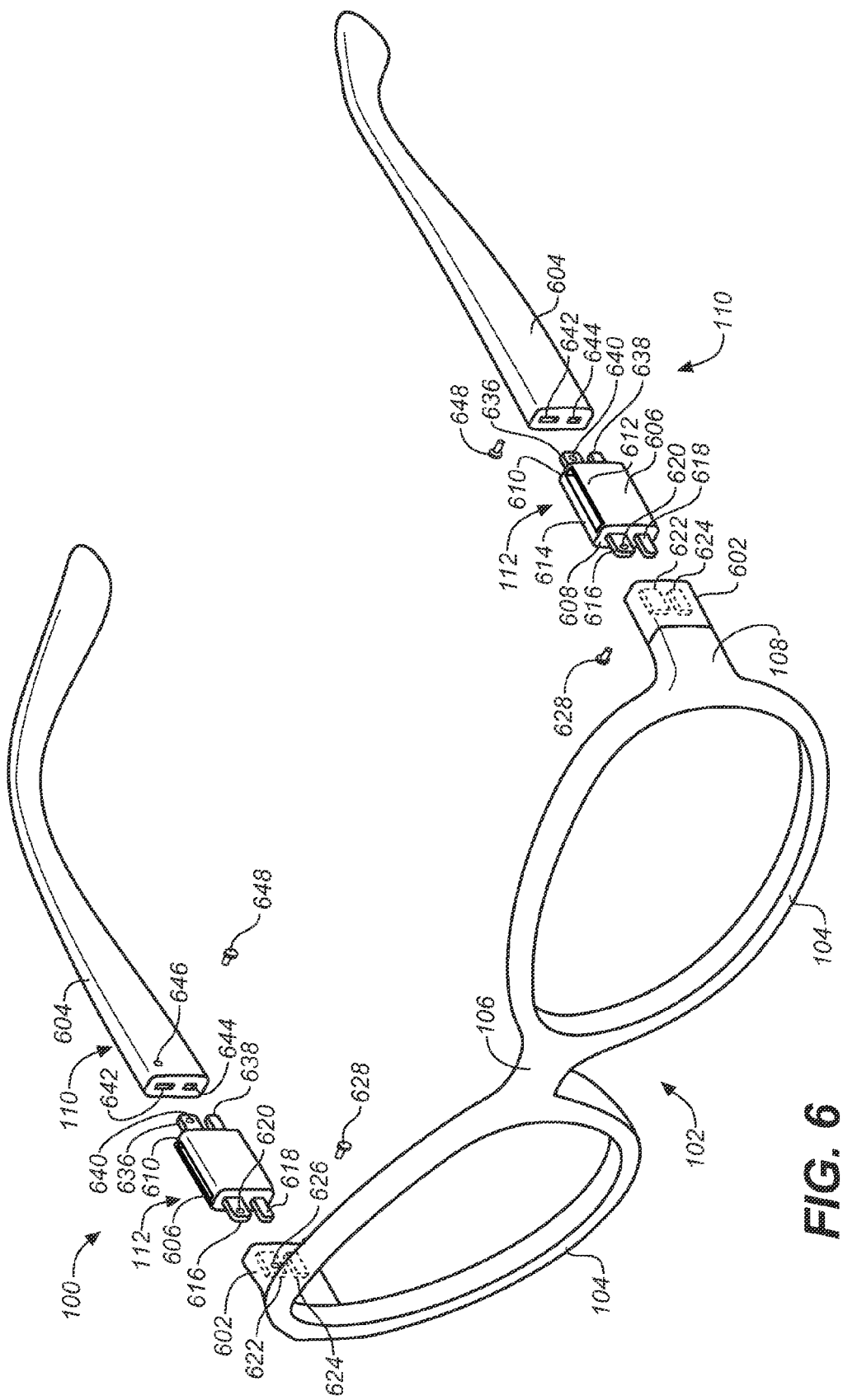
FIG. 6 is an exploded perspective view of the eyeglasses frame of FIG. 1 in one or more embodiments of the present disclosure.

FIG. 6 is an exploded perspective view of eyeglasses 100 in one or more embodiments of the present disclosure. In such one or more embodiments, each temple 110 includes a proximate portion 602 near end piece 108, a distal portion 604 away from the end piece, and a mid portion 606 coupled between the proximate and the distal portions. Mid portion 606 may have a body with the same or different height and width as the adjoining ends of proximate portion 602 and distal portion 604 to produce a continuous or varying profile for temple 110. The body may be substantially rectangular with two short sidewalls 608 and 610 and two long sidewalls 612 and 614 that define slot 112. Exterior sidewall 612 corresponds to the temple exterior sidewall 114 (FIG. 1), and interior sidewall 614 corresponds to temple interior sidewall 116 (FIG. 1). The width of exterior sidewall 612 may be thinner or thicker than the width of interior sidewall 614 so slot 112 is horizontally offset toward an exterior or interior surface of temple 110.

Tabs 616 and 618 extend from short sidewall 608. Tab 616 has a threaded screw hole 620. Tabs 616 and 618 are received in slots 622 and 624 (shown in phantom) in proximate portion 602. Proximate portion 602 defines a screw hole 626 in communication with slot 622. A screw 628 passes through screw hole 626 and engages threaded screw hole 620 to secure proximate portion 602 to mid portion 606.

Similarly tabs 636 and 638 extend from short sidewall 610. Tab 636 has a threaded screw hole 640. Tabs 636 and 638 are received in slots 642 and 644 in distal portion 604. Distal portion 604 defines a screw hole 646 in communication with slot 642. A screw 648 passes through screw hole 646 and engages threaded screw hole 640 to secure distal portion 604 to mid portion 606.

Figure 7:
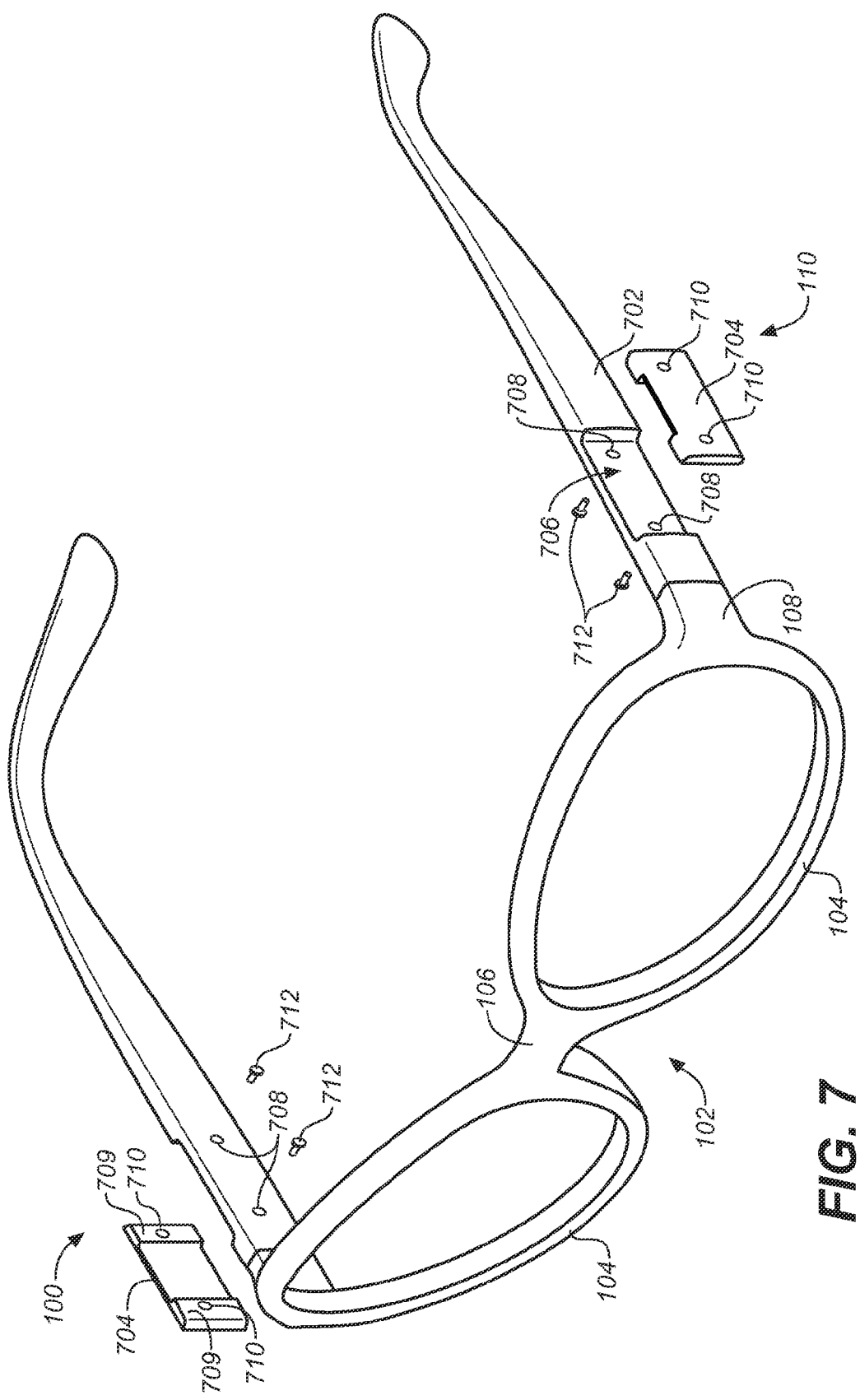
FIG. 7 is an exploded perspective view of the eyeglasses frame of FIG. 1 in one or more other embodiments of the present disclosure.

FIG. 7 is an exploded perspective view of eyeglasses 100 in one or more other embodiments of the present disclosure. In such one or more other embodiments, each temple 110 includes a temple body 702 and a cover plate 704. Temple body 702 defines a cutout 706 from an exterior surface of the temple body into the temple body, and screw holes 708 in the cutout. Cover plate 704 includes two ridges 709 with threaded screw holes 710. Screws 712 pass through screw holes 708 and engage threaded screw holes 710 to secure cover plate 704 to temple body 702. Cover plate 704 corresponds to exterior temple sidewall 114 (FIG. 1). Together cover plate 704 with ridges 709 and cutout 706 define slot 112 (FIG. 1).

Various other adaptations and combinations of features of the embodiments disclosed are within the scope of the invention. Instead of being distinct pieces that are assembled, proximate portion 602, distal portion 604, and mid portion 606 may be injection molded together as an integral piece. Numerous embodiments are encompassed by the following claims.

The invention claimed is:
1. An eyeglasses frame, comprising:
rims with end pieces; and
temples coupled to the end pieces, at least one temple defining a slot, the slot being flanked by exterior and interior temple sidewalls, the one temple comprising:
a temple body coupled to one end piece, the temple body defining a cutout from an exterior surface of the temple body into the temple body; and
a cover plate fixed to the temple body over the cutout to define the slot, the cover plate forming the exterior temple sidewall.

2. The eyeglasses frame of claim 1, wherein the exterior temple sidewall being thinner than the interior temple sidewall so the slot is horizontally offset toward an exterior surface of the one temple.

3. The eyeglasses frame of claim 1, wherein the exterior temple sidewall being thicker than the interior temple sidewall so the slot is horizontally offset toward an interior surface of the one temple.

4. The eyeglasses frame of claim 1, wherein:
the cover plate comprising two ridges defining two threaded screw holes; and
the temple body defines two screw holes for receiving screws securing the cover plate to the temple body via the two threaded screw holes.

5. The eyeglasses frame of claim 1, wherein the slot comprises a rectangular slot extending through the one temple.

6. An eyeglasses frame, comprising:
rims with end pieces; and
temples coupled to the end pieces, at least one temple defining a slot, the slot being flanked by exterior and interior temple sidewalls, the one temple comprising:
a proximate portion close to the rims and coupled to one end piece;
a distal portion away from the rims; and
a mid portion joining the proximate and the distal portions, the mid portion defining the slot, the mid portion comprising:
first and second short sidewalls;
exterior and interior long sidewalls, the exterior long sidewall being the exterior temple sidewall, the interior long sidewall being the interior temple sidewall;
a first tab extending from the first short sidewall of the body, the first tab defining a first threaded screw hole; and
a second tab extending from the second short sidewall of the body, the second tab defining a second threaded screw hole;
wherein:
the proximate portion defines a first slot for receiving the first tab and a first screw hole for receiving a first screw securing the proximate portion to the mid portion via the first threaded screw hole; and
the distal portion defines a second slot for receiving the second tab and a second screw hole for receiving a second screw securing the distal portion to the mid portion via the second threaded screw hole.

7. The eyeglasses frame of claim 6, wherein the body has the same widths and heights as adjoining ends of the proximate and the distal portions.

8. The eyeglasses frame of claim 6, wherein the body has different widths and heights than adjoining ends of the proximate and the distal portions.

9. The eyeglasses frame of claim 6, wherein the mid portion further comprises:
a third tab extending from the first short sidewall of the body, wherein the proximate portion defines a third slot for receiving the third tab; and
a fourth tab extending from the second short sidewall of the body, wherein the distal portion defines a fourth slot for receiving the fourth tab.

10. Eyeglasses, comprising:
an eyeglasses frame, comprising:
rims with end pieces; and
temples coupled to the end pieces, at least one temple defining a slot, the slot being flanked by exterior and interior temple sidewalls;

an accessory, comprising:
  an object;
  a hook fastener fixed to the object, the hook fastener being inserted in the slot to secure the accessory to the eyeglasses frame,
  the hook fastener comprising:
    a hook interior plate comprising a planar end;
    a hook exterior plate comprising a kinked end that curves toward the hook interior plate and then curves away from the hook interior plate, the kinked end being spring-loaded to rest on the hook interior plate, the hook exterior plate and the hook interior plate having the same reach so the kinked end and the planar end are even; and
    a mid section joining the hook exterior and interior plates;
  wherein the slope of the kinked end allows the exterior temple sidewall to push against the hook interior and the hook exterior plates when the hook fastener is initially inserted into the slot, and the kinked end snaps back down against the hook interior plate when the kinked end slides past the exterior temple sidewall once the hook fastener is fully inserted into the slot.

11. The eyeglasses frame of claim 10, wherein the object is selected from the group consisting of a piece of jewelry, a plush toy, an accessory, and a logo.

12. The eyeglasses frame of claim 10, wherein the object is selected from the group consisting of a flashlight, a Bluetooth device, a heads up display device, a laser pointer, a golf marker, a battery, an ear piece for a cellular phone, and a neck strap.

* * * * *